United States Patent [19]

Barnes et al.

[11] 4,282,263

[45] Aug. 4, 1981

[54] PROCESS FOR PRODUCING A GASIFIED FUSIBLE SUGAR COMPOSITION

[75] Inventors: J. Ray Barnes, Warson Woods; Robert E. Holdegraver, St. Louis; Raymond K. Meibaum, Florissant, all of Mo.

[73] Assignee: Sunmark, Inc., St. Louis, Mo.

[21] Appl. No.: 37,852

[22] Filed: May 10, 1979

[51] Int. Cl.³ .............................................. A23G 3/00
[52] U.S. Cl. .................................. 426/572; 426/474; 426/477; 426/660
[58] Field of Search ............... 426/572, 474, 477, 660; 127/12

[56] References Cited

U.S. PATENT DOCUMENTS

| | | | |
|---|---|---|---|
| 3,012,892 | 12/1961 | Kremzner | 426/572 |
| 3,985,909 | 10/1976 | Kirkpatrick | 426/572 |
| 3,985,910 | 10/1976 | Kirkpatrick | 426/572 |
| 4,001,457 | 1/1977 | Hegadorn | 426/572 |

Primary Examiner—Jeanette M. Hunter
Attorney, Agent, or Firm—Senniger, Powers, Leavitt and Roedel

[57] ABSTRACT

A process for producing a gasified solid product comprising an undissolved gas in a matrix of solid material comprising a fusible sugar. In the process, an aqueous solution of fusible sugar is continuously fed to an evaporator. The solution is continuously heated while it is flowed through the evaporator to drive off water and produce a concentrated fused sugar composition whose moisture content is low enough so that, at room temperature, the composition will congeal to a glass having a viscosity high enough to contain pressurized gas bubbles therein. The concentrated fused sugar composition is continuously discharged from the evaporator and a gas at a pressure of at least about 400 psig is introduced into a stream of the concentrated fused sugar composition. The concentrated fused sugar composition and gas are flowed through an in-line mixer and there subjected to intense agitation sufficient to achieve uniform dispersion of the gas throughout the sugar composition, thus producing a gasified fused sugar composition containing small evenly distributed bubbles of undissolved gas at a concentration of at least about 3 ml. (STP) gas per gram of concentrated sugar composition. The gasified fused sugar composition is cooled to produce a product comprising a solid matrix comprising sugar and having the properties of a glass and, contained within said matrix, evenly distributed small bubbles of the gas.

20 Claims, 4 Drawing Figures

PROCESS FOR PRODUCING A GASIFIED FUSIBLE SUGAR COMPOSITION

BACKGROUND OF THE INVENTION

This invention relates to the manufacture of gasified solid fusible sugar products and more particularly to a novel continuous process for concentrating an aqueous sugar solution and introducing gas into the resultant fused concentrated sugar composition. Solidification of the gasified fused sugar composition produces a gasified solid product.

Kremzner et al. U.S. Pat. No. 3,012,893 describes a technique for enclosing a gas within a solid matrix of fusible sugar in which a sugar melt is prepared and placed in a Parr reactor wherein it is maintained in a fused condition while carbon dioxide gas is admitted and the mixture agitated with a stirrer. This patent gives limited details on the process but, to the extent described, the process of Kremzner et al. is entirely a batch operation. Subsequent U.S. Pat. Nos. of Kirkpatrick 3,985,909, Kirkpatrick 3,985,910 and Hagedorn 4,001,457, each issued to the assignee of the Kremzner et al. patent, describe refinements to Kremzner et al. method for producing a carbonated candy product. In each of these references, however, the process described remains an entirely batch process in which gas is introduced into the headspace of an autoclave containing a fused sugar composition and mixed by stirring of the contents in the autoclave. Kirkpatrick U.S. Pat. No. 3,985,909 describes an improvement in which the shaft of the stirrer or agitator has a hollow interior with sidewall openings at each end so that mixing is assisted by the passage of gas through the shaft, exiting at the bottom thereof for dispersion by rotating paddle blades mounted on the shaft.

In the batch processes described in the aforesaid references, mixing requires stirring for a significant period of time, during which the melted sugar is exposed to temperatures in the range of 300° to 325° F. Such exposure can lead to both the production of invert sugar by hydrolysis of sucrose and to browning of the sugar composition due to thermal degradation thereof. Inasmuch as the gas component is simply introduced into the headspace of an autoclave filled with an amount of melted sugar that is determined primarily by payload and agitation considerations, there is no positive control over the relative proportions of gas and liquid and, consequently, no positive control over the gas content of the gasified sugar product. Additionally, the productivity of the batch process is limited by the significant mixing time requirement as well as by the autoclave charging and discharging operations which are necessary parts of the batch cycle but constitute dead time so far as the gasification operation is concerned. Moreover, the processes heretofore known to the art have not been adapted for the incorporation of voltatile or thermally sensitive additives such as, for example, certain natural flavors and colors. There is thus a need in the art for an improved process for producing gasified solid sugar products, and particularly for an improved process which is adapted to overcome the various limitations which are experienced with the batch processes described in the aforesaid references.

SUMMARY OF THE INVENTION

Among the several objects of the present invention, therefore, may be noted the provision of an improved process and apparatus for producing a gasified solid fusible sugar product; the provision of such a process and apparatus capable of producing a high quality gasified fusible sugar product; the provision of such process and apparatus capable of producing a gasified sugar product with minimal thermal degradation or sugar inversion; the provision of such process and apparatus which are adapted for consistent and reliable production of a gasified solid fusible sugar product; the provision of such process and apparatus which can be operated to provide accurate proportioning of gas and molten sugar to control effectively the gas content of the solid gasified product; the provision of such process and apparatus which can be operated in a controlled manner to vary the gas bubble size in and the organoleptic character of the gasified solid sugar product; the provision of such apparatus and process which can be operated to produce a gasified solid sugar product at high productivity; the provision of such apparatus and process which can be utilized to produce a gasified solid sugar product containing volatile or thermally sensitive additives; and the provision of such a process which is operated continuously and such apparatus which is adapted for continuous operation.

Briefly, therefore, the present invention is directed to a process for producing a gasified solid product comprising an undissolved gas in a matrix of solid material comprising a fusible sugar. In accordance with the process, an aqueous solution of fusible sugar is continuously fed to an evaporator. The solution is continuously heated while it is flowing through the evaporator to drive off water and produce a concentrated fused sugar composition whose moisture content is low enough so that, at room temperature, the composition will congeal to a glass having a viscosity high enough to contain pressurized gas bubbles therein. The concentrated sugar composition is continuously discharged from the evaporator. A gas at a pressure of at least about 400 psig is continuously introduced into a stream of the concentrated sugar composition and the concentrated sugar composition and gas flow through an in-line mixer and are there subjected to intense agitation. Agitation is sufficient to achieve, within a residence time of not more than about four minutes, uniform dispersion of the gas throughout the sugar composition and produce a gasified fused sugar composition containing small evenly distributed bubbles of undissolved gas at a concentration of at least about 3 ml. (STP) gas per gram of concentrated sugar composition. The fused gasified sugar composition is cooled to produce a product comprising a solid matrix comprising sugar and having the properties of a glass and, contained within said matrix, evenly distributed small bubbles of said gas.

In another important aspect, the invention is directed to an apparatus for use in a continuous process for producing a gasified solid product comprising an undissolved gas in a matrix of solid material comprising a fusible sugar. The apparatus includes a tank having agitation and heating means for preparing an aqueous solution of fusible sugar. A positive displacement feed solution pump is adapted for transferring to an evaporator the aqueous solution that is prepared in the tank. The discharge of the feed solution pump is connected to the inlet of an evaporator comprising means for heating a liquid moving continuously therethrough and means for separating from the liquid phase water vapor produced by such heating so as to concentrate the liquid and produce a fused sugar composition. A positive displacement underflow pump is provided for continuously transferring fused sugar composition produced in the evaporator. A discharge pipe line is connected to the discharge of the evaporator underflow pump and the discharge line contains a gas sparger therewithin for introduction of a gas into the fused sugar composition stream discharged from the underflow pump. A supply of gas under pressure is connected to the sparger for delivery of gas thereto at a pressure of at least about 400 psig. An in-line mixer is connected to the discharge pipeline downstream of the sparger for intimate mixing of the gas and fused sugar composition. A cooler is provided downstream of the in-line mixer for receiving gasified fused sugar composition underflow and cooling it to produce a solid product. There is a gas connection on the cooler and means are provided for alternately connecting said gas connection to a vent to the atmosphere or to a source of the same gas used for gasification of the sugar composition so that gas pressure may be maintained in the cooler at a level high enough to prevent substantial escape of gas from the gasified sugar composition but low enough to permit flow of gasified sugar composition from the in-line mixer to the cooler.

Other objects and features will be in part apparent and in part pointed out hereinafter.

BRIEF DESCRIPTION OF THE DRAWINGS

Corresponding reference characters indicate corresponding parts throughout the drawings in several views of the drawings.

DESCRIPTION OF THE PREFERRED EMBODIMENTS

Figure 1:
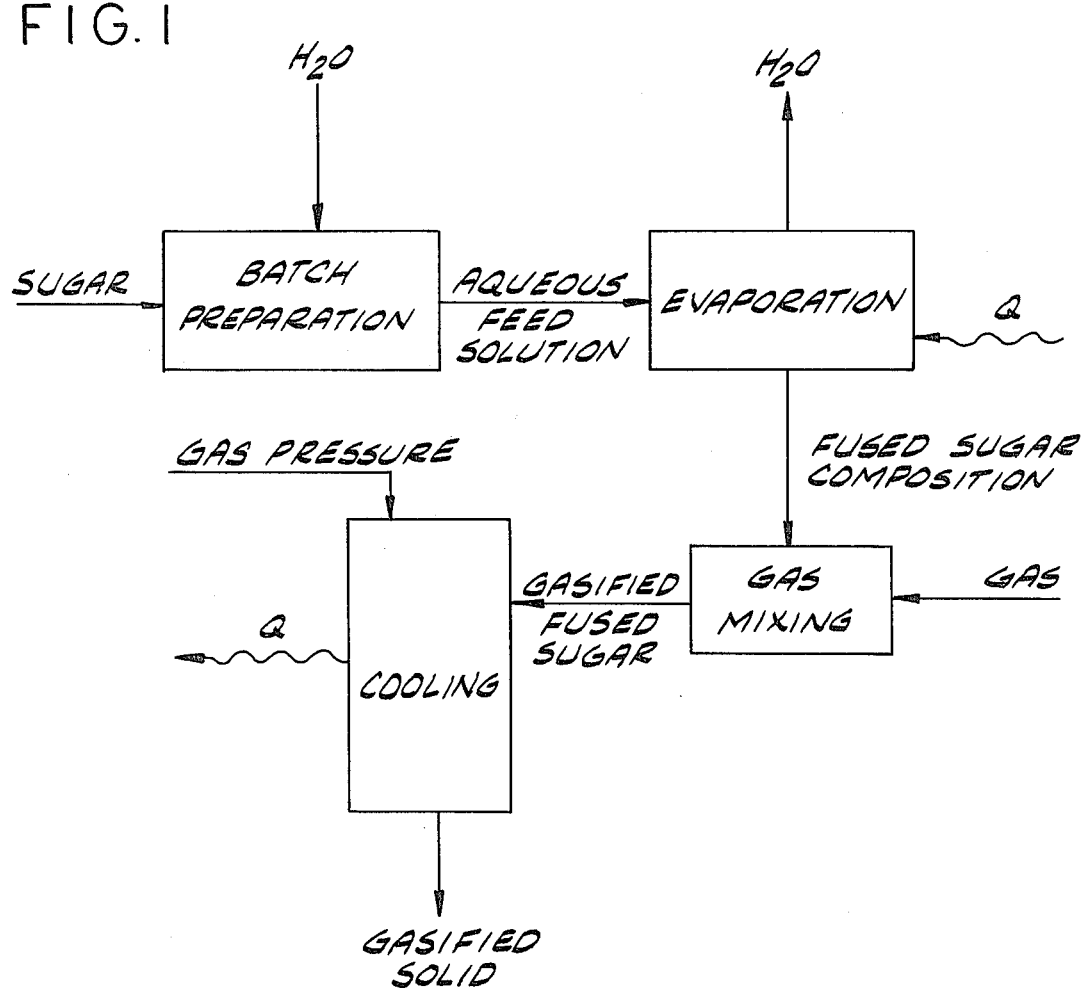
FIG. 1. is a schematic flow sheet illustrating the process of the invention.

In accordance with the present invention, a novel and improved process has been discovered for the continuous production of a carbonated candy glass. The process can be controlled to produce high quality carbonated candy products exhibiting a variety of organoleptic sensations. More particularly, the process can be controlled to produce a product which is low in invert sugar and other thermal degradation products and which contains a high concentration of very small bubbles of undissolved carbon dioxide evenly distributed throughout a solid candy matrix. Although primarily directed to the production of a carbonated candy, the process of the invention is effective for the gasification of fusible sugar compositions with a variety of gases including air, nitrogen, helium or other noble gases.

The material to be gasified can be comprised of any of a variety of fusible sugars and mixtures thereof. For use in the preparation of carbonated candy the sugar composition is preferably comprised predominantly of sucrose. Other fusible disaccharide sugars include lactose, maltose and fructose. Among the numerous useful monosacchride sugars are glucose, fructose and arabinose. The process is also applicable for the gasification of polysaccharide sugar compositions including gentiobiose, cellobiose, maltotriose, maltotetrose, etc. As used herein the term fusible sugar further applies to sugar acids such as gluconic acid and saccharic acid and sugar alcohols such as sorbitol, xylitol and mannitol. The sugar composition is preferably one which after melting can be supercooled to produce a solid product having the properties of a glass.

Optionally the sugar composition may also include dextrin, starch, gelatin or gum, as taught in Kremzner U.S. Pat. No. 3,012,893. However, under the conditions of the process of the invention, adequate gas content can be achieved without the inclusion of any of these components which Kremzner teaches as desirable for increasing gas content.

The composition to be gasified may also advantageously contain natural or artificial flavors and colors. Such are normally included when a carbonated candy product is produced. Alternatively, such flavors or colors can be injected into the gasified fused sugar composition shortly before cooling. But in either case, and in contrast to the batch processes of the prior art, the process of the invention is adapted for incorporation of volatile or thermally sensitive flavors or colors, which are exposed to high temperature for only brief periods of time and are consequently neither driven off or degraded.

Normally the solid phase of the gasified solid product includes a small amount of water for example, 0.5–3% by weight. Excessive proportions of water render the solid product unpleasantly sticky and may even lower its room temperature viscosity to a level at which it cannot contain pressurized gas. However, small proportions of water in the aforementioned range are not deleterious and have the advantage of lowering the fusing point or fusing range of the sugar to temperatures which are convenient for processing and at which there is no substantial thermal degradation of the sugar, at least when short residence times are maintained under molten conditions.

Water appears in the product as a result of its deliberate incorporation in the sugar compositions fed to the process. The presence of water arises not only from the use of some sugar sources which contain substantial amounts of water, for example, corn syrup, but also from the addition of free water to produce an aqueous solution of the feed material.

The use of an aqueous feed solution instead of a solid fusible sugar facilitates heat transfer in bringing the sugar to a molten state at a temperature at which gas incorporation can be carried out. It also facilitates handling process materials in a continuous operation since it permits the critical steps of the process to be carried out with the sugar composition in the liquid phase throughout. As a result of such deliberate introduction of water into the feed material the solid phase of the product necessarily contains a small amount of water, for example the 0.5–3% by weight referred to above. More complete removal of water would not only require substantial additional processing time and energy consumption but would expose the sugar components to elevated temperatures at which thermal degradation can occur.

As illustrated in FIG. 1, operation of the process of the invention is commenced by preparing an aqueous solution of a fusible sugar. This aqueous feed solution is then passed though an evaporator to heat the sugar and drive off moisture, thereby providing a fused concentrated sugar composition adapted for direct gasification.

Gasification is then carried out using an in-line mixer, after which the gasified concentrate (evaporator underflow) is cooled to provide the solid product of the invention. By carrying out both the evaporation and mixing steps in an entirely continuous operation, high productivity is achieved and there is a minimum time of exposure of sugar components to elevated temperature. To a considerable practical extent, continuous operation of the mixing step also permits positive control of the relative flow of molten concentrate and gas and thus of the gas content of the ultimate product. If desired, the batching and cooling steps of the process can also be carried out continuously, but it is equally convenient to carry these steps out on a batch basis since neither productivity nor product quality is adversely affected thereby.

In the batching step, a composition is prepared which preferably contains a mixture of sugars and between about 7% and about 20% by weight water. A portion of the water content may conveniently be derived from an aqueous sugar composition such as corn syrup. Thus, for example, a preferred composition contains between about 42% and about 52% by weight sucrose, between about 18% and about 23% by weight corn syrup, between about 18% and about 22% by weight lactose and between about 3% and about 16% by weight separately added free water. An aqueous solution is prepared by charging these components to a mixing tank, conveniently a steam jacketed agitated kettle, and mixing the ingredients with stirring while heating them to a temperature of approximately 180°–200° F. For very high volume operations, the ingredients can be metered continuously in the requisite relative proportions into a heated mixing vessel from which the resultant aqueous solution may be pumped to a surge tank for delivery to the evaporator. In small to moderate scale operations, however, it may be as convenient to produce the aqueous feed solution on a batch basis and transfer batchwise to a surge tank from which the evaporation is continuously supplied.

In the evaporation step, the aqueous sugar solution is heated to drive off water and produce a molten concentrated sugar composition adapted for subsequent gasification. As noted above, the moisture content of the sugar composition is reduced to a value between about 0.5% and about 3% by weight. Preferably the moisture content is in the range of about 1.5–2.5% by weight. If evaporation is carried out under atmospheric pressure, an evaporator underflow (concentrated sugar composition) stream is produced at a temperature of at least about 280° F., typically 290°–310° F. Lower temperature underflow is produced if evaporation is carried out under vacuum.

Although essentially any conventional evaporator may be utilized, it is preferable to provide an evaporator system in which residence time is short so as to minimize exposure of the sugar components to elevated temperatures. Preferably, a thin-film evaporator is used. Especially rapid concentration can be effected with a jacketed agitated thin-film evaporator such as that available under the trade designation "Votator Turbafilm Processor" from Chemetron Corporation. Alternatively, an evaporator such as that sold by Groen Corp. may be used. In this type of evaporator, the aqueous solution is passed vertically upward through a thin annular column and heat is applied through the inner wall of the annulus.

The fused concentrated sugar composition flowing out the bottom of the evaporator is fed to the gas mixing step. The essential element of the mixing system is a dynamic in-line mixer through which the molten sugar composition and gas are moved continuously, and in which they are subjected to intense agitation. Preferably, two stage mixing is provided by initially introducing the gas into a stream of the fused concentrated sugar upstream of the in-line mixer. If desired, three stage mixing can be provided by passing the gas/molten sugar mixture continuously through a static mixer downstream of the dynamic in-line mixer.

In the in-line mixer, agitation should be intense enough to provide substantially even distribution of small bubbles of undissolved gas throughout the molten sugar at a concentration of at least about 3 ml. gas (standard temperature and pressure) per gram of sugar composition. In order to achieve this result with minimum residence time, for exaple, four minutes or less in the mixer, the mixing energy input at the in-line mixer should preferably be at least about 28,000 ft. lbs/lb. of product and the energy intensity should preferably be at least about 2–3 hp./gal. in the mixer head. A product having somewhat larger bubbles of gas can be produced with lower energy inputs and intensities. To provide the requisite mixing intensity, it is desirable to use a mixer such as that sold under the trade designation "Super Dispax" by Tekmar Company of Cincinnati, Ohio or "Votator C.R. Mixer" by Chemetron. These types of mixers provide at each instant an array of a multiplicity (e.g. eight or more) of shear planes created by relative movement of a multiplicity of static surfaces on a stator and a multiplicity of dynamic surfaces on a rotor at a multiplicity of spaced locations throughout the mixer. For larger bubbles that provide a popping sensation, the instantaneous number of shear planes is preferably reduced to what is defined herein as a "plurality", i.e. two to seven. A given mixer whose stator has a multiplicity of surfaces can alternately be adapted to make large bubbles by use of a rotor with a plurality of surfaces and fine bubbles with a rotor having a multiplicity of surfaces. The speed of rotation also affects the intensity of agitation and thus the bubble size.

Introduction of gas upstream of the dynamic in-line mixer is preferably made through a sparger. Conveniently, it is located downstream of an evaporator underflow pump and is oriented concentrically in a pipeline through which transfer to the in-line mixer is made. Gas is introduced through the sparger at a pressure of at least about 400 psig, preferably about 600 psig.

The static mixer, which may be optionally utilized downstream of the dynamic mixer, has no moving parts but is provided with internal elements which create turbulence and/or progressive divisions and recombinations in the gas-containing concentrated fused sugar composition passing therethrough, and thus further contributes to gas bubble partition and distribution throughout the melt. Energy for agitation in the static mixer is derived from pressure drop in the process stream flowing therethrough.

After completion of all agitation and mixing steps, the gasified concentrated fused sugar composition is cooled to a temperature at or near room temperature to produce a gasified solid product comprising undissolved gas in a matrix of solid sugar material. Cooling can be done either continuously or batch-wise, and a variety of cooler configurations can be used. However, regardless of the particular nature of the cooling equipment, it is important that the cooler be pressurized, preferably with the same gas that is contained within the gasified fused sugar composition, at a pressure that is sufficiently high to avoid substantial escape of gas from that composition. At the same time, the gas pressure in the cooler must be low enough to permit continuous flow of the gasified fused sugar composition into the cooler.

The product of the process of the invention comprises a solid matrix comprising a fusible sugar and, evenly distributed throughout said matrix, a high concentration of very small bubbles of gas. By use of the preferred high intensity and character of mixing and by use of a gas pressure of at least about 400 psig, a product is obtained in which at least about 90% of the bubbles have a diameter of less than about 80 microns. A product having these characteristics provides a very distinct and lively organoleptic sensation comparable to the sizzling of frying bacon.

In accordance with the process of the invention, a control option is provided whereby a more conventional type of gasified sugar product can be produced while maintaining continuous operation and the other advantages attendant thereon. Thus, by reduction in the intensity of agitation, a product containing larger bubbles and affording a distinctive popping sensation may be produced.

The following example illustrates the invention.

EXAMPLE

Figure 2:
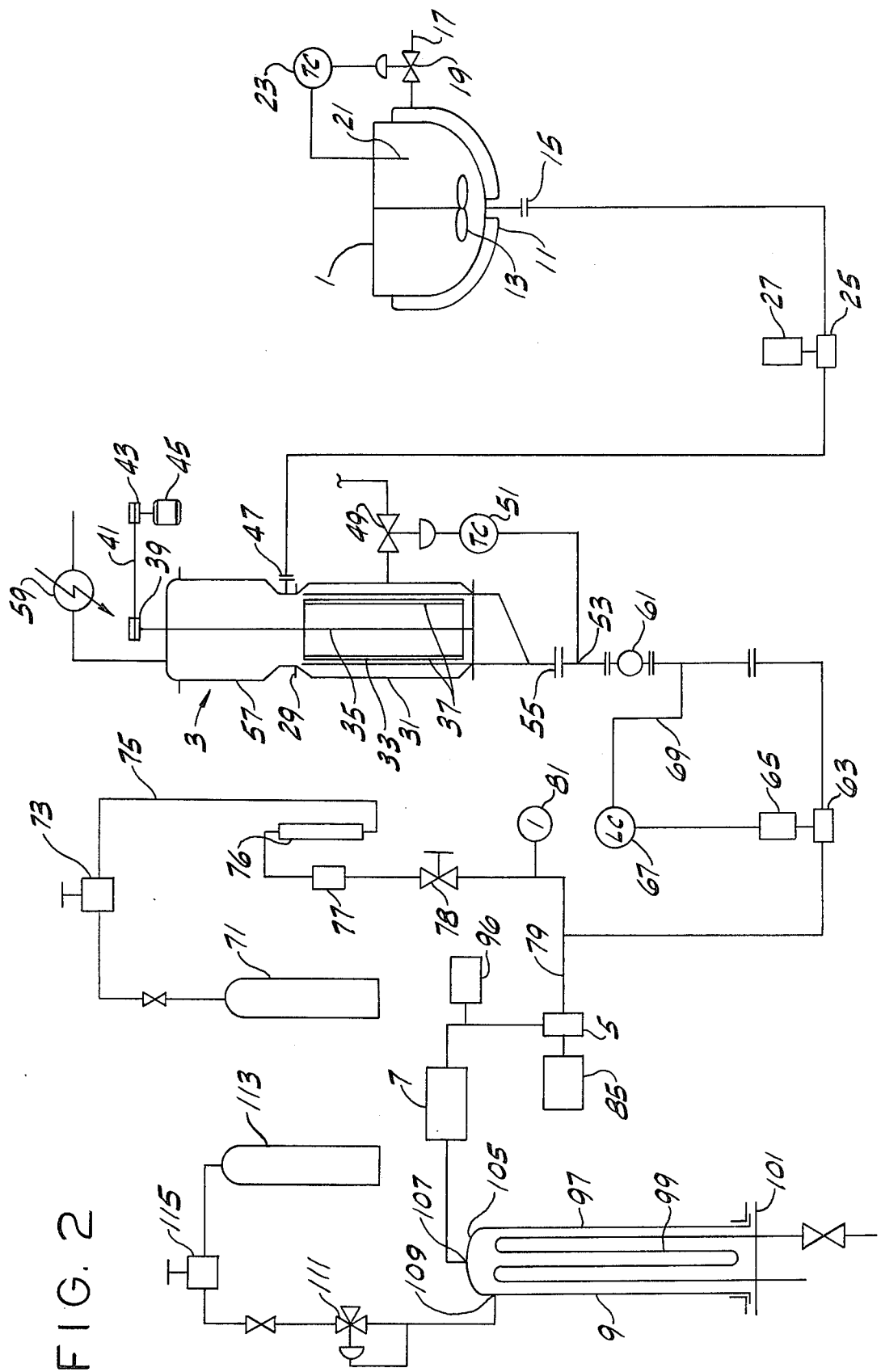
FIG. 2. is process equipment and control schematic illustrating an apparatus adapted for carrying out the process of the invention.

Carbonated candy was produced using a system similar to that illustrated in FIG. 2. The principal items of process equipment in this system include a mixing kettle 1 in which an aqueous sugar solution is prepared, a thin-film evaporator 3 for producing a concentrated fused sugar composition, a dynamic in-line mixer 5 for continuously mixing gas with the concentrated fused sugar composition, a static mixer 7, and a cooler 9 in which solid product is produced.

Mixing kettle 1 is provided with a jacket 11, an agitator 13 and a bottom discharge nozzle 15. Steam is admitted to jacket 11 through a steam line 17 and a control valve 19. Temperature of the ingredients of the tank are measured at a temperature sensor 21 and controlled by an automatic temperature controller 23 which throttles valve 19 to admit the requisite amount of steam for providing and maintaining a desired temperature. Feed ingredients can be delivered either continuously or batchwise to mixing kettle 1. If feed materials are delivered continuously, however, a surge tank is needed between the mixing kettle and the evaporator. For continuous evaporator operation over any extended time period, such a surge tank is provided regardless of whether mixing is carried out on a batch or continuous basis.

The aqueous feed solution is transferred to evaporator 3 by a gear pump 25 operated by a variable speed motor 27 whose speed is set to establish the desired feed rate and thereby to control the production rate of the process.

Thin-film evaporator 3 comprises a column 29 provided with a jacket 31 and having an internal agitator 33 comprising a shaft 35 that is concentric with the column and on which are mounted wiper blades 37 which agitate the film on the internal wall of column 29 as shaft 35 is rotated. The shaft has a sheave 39 on the upper end thereof and is driven by a belt 41 which in turn is driven by a sheave 43 mounted on the shaft of a motor 45. Feed solution transferred from mixing kettle 1 by gear pump 25 is received at an inlet 47 of evaporator 3 whence it flows down the inside wall of column 29 and is heated by steam or other heating medium which is admitted to jacket 31 through a control valve 49 that is throttled by a temperature controller 51 in response to the temperature of concentrated fused sugar composition measured by a sensor 53 in the discharge from the bottom of column 29 at an outlet 55. Water evaporated out of the feed solution separates from any entrained liquid in an entrainment separator 57 mounted on column 29, and passes out of evaporator 3 either to the atmosphere or to a condenser 59. Because the vapor leaving the evaporator is essentially water, condensation is not normally necessary for a commercial scale operation.

Concentrated fused sugar composition discharging from evaporator 3 at outlet 55 passes through a sight feed coupling 61 and is continuously transferred to in-line mixer 5 by an evaporator underflow gear pump 63. Pump 63 is operated by a variable speed motor 65 whose speed is controlled by a level controller 67 in response to a level sensor 69 to maintain a constant level in the line between the evaporator and the pump suction.

Carbon dioxide from a cylinder 71 is supplied through a pressure regulator 73, a gas line 75, a rotameter 76, an electric gas heater 77 and a needle valve 78 and introduced into the concentrated sugar composition through a sparger (not shown) located in a pipeline 79 that connects the discharge of evaporator underflow pump 63 to the inlet of dynamic in-line mixer 5. Needle valve 78 is manually adjusted to maintain either a desired pressure, as indicated by a pressure gauge 81, or a desired flow as indicated at rotameter 76.

Partial mixing of carbon dioxide and concentrated molten sugar composition is achieved in the zone immediately surrounding the sparger, and intimate mixing of gas and molten sugar is carried out in the head of dynamic in-line mixer 5. As illustrated schematically in FIG. 3 this mixer has a rotor 83 mounted on shaft of a drive motor 85 (FIG. 2) and a stator 87 contained within a housing 89 for the rotor. Stator 87 comprises concentric cylindrical rings 88 that are coaxial with the motor shaft and segmented by slots therein to provide concentric circumferential arrays of mixing elements 90. Although partially obscured in the view of FIG. 3, the rotor also comprises a cylindrical ring 84 segmented by slots to provide a corresponding array of rotor mixing elements 86. Alternatively, the rotor and stator are constituted of circumferential arrays of pins. As a result of such arrangement, a multiplicity of dynamic surfaces 91 on the rotor are oriented for close clearance with respect to a multiplicity of static surfaces 93 on the stator, thus creating, at any instant, an array of a multiplicity of shear planes at spaced locations throughout the mixer when the rotor is turned by motor 85. As shown in the drawing a plurality of arrays is conveniently provided in concentric circular patterns. Intimate mixing is attained when concentrated sugar and gas are passed through these shear planes which are reached by passage through ports 95 in the rotor. Progressive subdivision of material also takes place as it passes successively through concentric arrays of surfaces. Preferably, some degree of internal recirculation is provided in mixer 5, for example by a clearance between the rotor and the forward wall of housing 89 so that the concentrated sugar composition and gas may re-enter ports 95 and make more than one passage through the array of shear planes.

Three-stage mixing is provided by passing the gasified fused sugar composition discharged from mixer 5 through static mixer 7. This static mixer contains a series of elements which cause a progression of divisions and recombinations of the fluid passed therethrough and also tend to impart turbulence to the fluid. Such a mixer may, for example, be of the type sold under the trade designation "Koch Static Mixing System" by Koch Engineering Company, Inc., which has an axially aligned series of mixing elements comprised of paralled corrugated sheets in which the corrugation angle of adjacent sheets is reversed with respect to the mixer axis.

At a point between the pump 63 and the cooler, thermally sensitive colors or flavors, e.g. those of natural origin or derivation may be injected into the gasified sugar composition by a pump 96.

Figure 4:
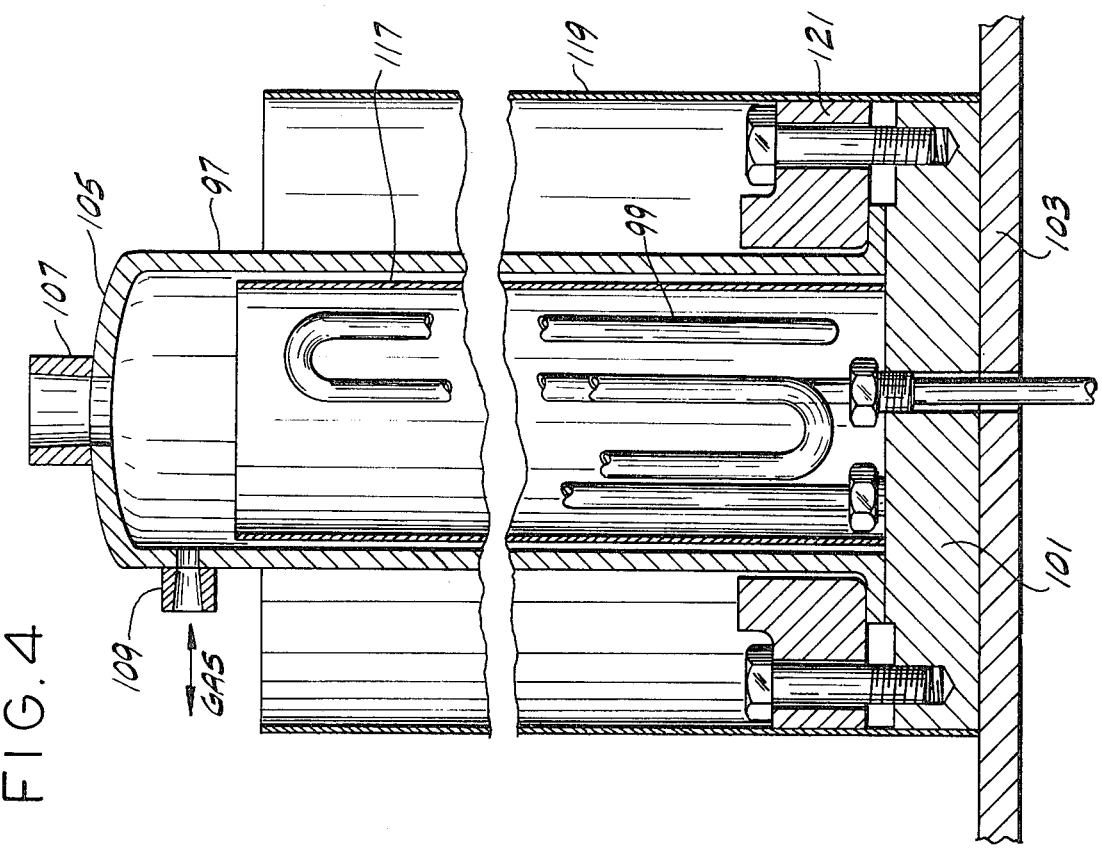
FIG. 4. is a sectional elevation showing a cooler adapted for use in the process of the invention.

From static mixer 7, the gasified fused sugar composition passes into cooler 9 where it is cooled to provide the solid product of the invention. As illustrated in FIG. 4, cooler 9 includes a vertical tube 97 within which is disposed a cooling coil 99 that has an inlet and an exit passing through a blank flange 101 which provides a closure for the bottom of tube 97. The cooler is supported on a platform 103 through which the inlet and exit line of coil 99 are passed. Cooler 9 further includes a head 105 having a connection 107 to a pipline for delivery of gasified sugar composition from static mixer 7 and a gas connection 109 which may alternately be in communication with the atmosphere through one port of a back pressure control valve 111 or in communication with a gas supply 113 through another port of valve 111 and a pressure regulator 115. By operation of valve 111 and pressure regulator 115, carbon dioxide pressure is maintained in cooler 9 at a pressure high enough to avoid substantial escape of gas from the gasified sugar composition but sufficiently low to permit continuous flow of that composition into the cooler.

As further shown in more detail in FIG. 4, cooler 9 also includes an internal sleeve 117 which is disposed within tube 97 and spaced radially of the inside wall thereof. Conveniently, sleeve 117 is not of continuous tubular shape, but instead is formed from a sheet of metal that is of sufficient length to extend from the top to the bottom of tube 97 and is coiled so that one end of the sheet slightly laps the other when the sheet is inserted in the tube. On completion of cooling, release of pressure from the cooler allows expansion of solid gasified sugar product within sleeve 117, thereby causing the sleeve to expand and the product to break away from the sleeve and fragment. The sleeve is preferably of sufficiently heavy gauge sheet so that expansion thereof is not so great as to to permit adherence of the sleeve to the tube wall. By advoidance of adherence, the product can be removed from the cooler without application of mechanical shock.

Preferably cooler 9 further includes an external sleeve 119 of continuous tubular construction which is adapted for sliding fit over blank flange 101 and bottom flange 121 of tube 97. Use of the external sleeve permits removal of solid product from the cooler with a minimum scatter of pieces or particles thereof. This is accomplished by resting the cooler on support surface 103 with external sleeve 119 surrounding flanges 101 and 121, detaching external water piping from coil 99, detaching tube 97 from flange 101, lifting the tube while sliding sleeve 117 out of the bottom thereof, and emptying the contents of sleeve 117 into the space defined by sleeve 119. Residual product adhering to coil 99 can be removed by poking with a rod. The product collected within sleeve 119 can then be transferred to bulk storage or packaging.

Figure 3:
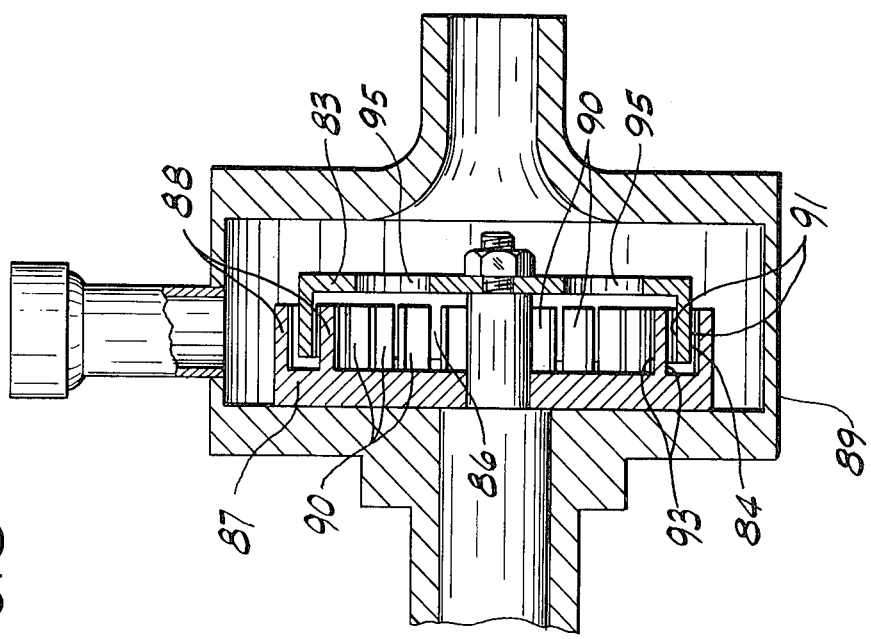
FIG. 3. is a schematic drawing showing the working elements of a dynamic line mixer useful in the apparatus of the invention.

In the demonstration run of this example, the apparatus utilized conformed substantially to that shown in FIGS. 2, 3 and 4 except that no static mixer or flavor injection pump was utilized and manual control was imposed in lieu of temperature controller 23, temperature controller 51 and level controller 67.

An aqueous feed solution was prepared in the mixing kettle having the following composition:

| | |
|---|---|
| Corn syrup | 21.08% |
| Lactose | 20.34% |
| Water | 11.14% |
| EFG sugar (sucrose) | 47.42% |

This solution was heated to a temperature of approximately 180° F. in the kettle and pumped by the feed solution gear pump to the evaporator at a rate of 6.5 gallons per hour. In the evaporator, the feed solution was heated to drive off moisture and produce a fused sugar evaporator underflow at a temperature of about 305° F. and a rate of 66 pounds per hour. Residence time in the evaporator was approximately 30 seconds. The fused sugar composition had a moisture content of approximately 2%.

The evaporator underflow was transferred from the evaporator discharge line by the underflow gear pump and mixed in a pipeline with carbon dioxide gas that was sparged into the line and controlled at 600 psig. Carbon dioxide gas flow was observed to be $1.1 \times 10^4$ ml. (standard pressure and temperature) per minute.

The gas/fused-sugar mixture then passed into the dynamic mixer where it was agitated with a power input of approximately 40,000 ft-lbs. per pound product and 4 hp/gal mixer volume. Residence time in the line mixer was approximately 3 minutes and 45 seconds.

From the mixer the gasified fused sugar composition was transferred to the cooler where it was cooled to room temperature with city water passed through the cooling coil. Residence time in the system from the inlet of the evaporator to the inlet of the cooler was 10-11 min. Cooling was complete in 80 minutes after which the water supply was turned off, the water connections were detached from the cooling coil and product removed and recovered within an external sleeve in the manner described hereinabove. The product was observed to contain essentially no invert sugar and exhibited essentially no discoloration. It contained approximately 4-6 ml. carbon dioxide (STP) per gram of solid product distributed evenly throughout a solid sugar matrix in gas bubbles of which 90% had diameters less than 80 microns. Upon subjection of this product to organoleptic testing, it was found to provide a high level of effervescence and a very lively mouth sensation akin to that of frying bacon.

In view of the above, it will be seen that the several objects of the invention are achieved and other advantageous results attained.

As various changes could be made in the above methods and apparatus without departing from the scope of the invention, it is intended that all matter contained in the above description or shown in the accompanying drawings shall be interpreted as illustrative and not in a limiting sense.

What is claimed is:

1. A process for producing a gasified solid product comprising an undissolved gas in a matrix of solid material comprising a fusible sugar, the process comprising the steps of:

continuously feeding an aqueous solution of fusible sugar to an evaporator;

continuously heating said solution while flowing it through the evaporator to drive off water and produce a concentrated fused sugar composition whose moisture content is low enough so that, at room temperature, the composition will congeal to a glass having a viscosity high enough to contain pressurized gas bubbles therein;

continuously discharging said concentrated sugar composition from said evaporator;

continuously introducing a gas at a pressure of at least about 400 psig into a stream of said concentrated sugar composition; flowing said concentrated sugar composition and said gas through an in-line mixer and there subjecting them to intense agitation sufficient to achieve uniform dispersion of the gas throughout the sugar composition and produce a gasified fused sugar composition containing small evenly distributed bubbles of undissolved gas at a concentration of at least about 3 ml. (STP) gas per gram of concentrated sugar composition; and cooling said gasified sugar composition to produce a product comprising a solid matrix comprising sugar and having the properties of a glass and, contained within said matrix, evenly distributed small bubbles of said gas.

2. A process as set forth in claim 1 wherein the total residence time of said solution, concentrated sugar composition, and gasified sugar composition in the process between introduction of said solution into the inlet of said evaporator and the commencement of cooling of said gasified sugar composition is not greater than about fifteen minutes.

3. A process as set forth in claim 2 wherein the residence time in said in-line mixer is less than about four minutes.

4. A process as set forth in claim 3 wherein agitation in said in-line mixer comprises passage of said concentrated sugar composition and gas through an array of a multiplicity of shear planes created by the relative movement of static and dynamic surfaces at a multiplicity of spaced locations throughout said in-line mixer.

5. A process as set forth in claim 4 wherein said concentrated sugar composition and gas are recirculated for more than one passage through said array of shear planes.

6. A process as set forth in claim 5 wherein the energy input in said in-line mixer is at least about 28,000 ft-lbs per pound sugar and the energy intensity is at least about 2 hp/gal in the mixer.

7. A process as set forth in claim 6 wherein said in-line mixer comprises a rotor and a stator with a multiplicity of surfaces on the rotor oriented for close clearance with respect to a multiciplicity of corresponding surfaces on the stator for creating said shear planes.

8. A process as set forth in claim 6 wherein said gas is introduced into said stream through sparger oriented inside a pipe carrying said stream upstream of said line mixer, thereby providing two stage mixing in which the first stage is carried out in a zone surrounding said sparger and the second stage is carried out in said in-line mixer.

9. A process as set forth in claim 8 wherein a static mixer is provided downstream of said in-line mixer and three stage mixing of the said concentrated sugar composition and said gas is thereby provided.

10. A process as set forth in claim 1 wherein the moisture content of said concentrated fused sugar composition is not greater than about 3% by weight.

11. A process as set forth in claim 10 wherein the process side residence time in said evaporator is not greater than about two minutes.

12. A process as set forth in claim 11 wherein said evaporator is an agitated thin-film evaporator.

13. A process as set forth in claim 11 wherein evaporation is carried out at substantially atmospheric pressure.

14. A process as set forth in claim 13 wherein the concentrated fused sugar composition is discharged from said evaporator at a temperature of between about 290° and about 310° F.

15. A process as set forth in claim 13 wherein the temperature of said concentrated fused sugar composition is at least about 280° F. during the step of mixing of the gas therewith.

16. A process as set forth in claim 1 wherein the gasified fused sugar composition is discharged from said in-line mixer into a cooler that is pressurized with the same gas that is contained within the gasified fused sugar composition at a pressure that is maintained sufficiently high to avoid substantial escape of gas from the gasified fused sugar composition but sufficiently low to permit continuous flow of the gasified fused sugar composition into the cooler.

17. A process as set forth in claim 16 wherein said cooler comprises a vertical tube having a cooling coil disposed therewithin and a sleeve between the coil and the tube wall and spaced radially from said wall, whereby cooled product solidifies on the inner surface of the sleeve out of contact with said wall, and the product is recovered by opening said tube, sliding said sleeve out of the tube and recovering said product from the sleeve.

18. A process as set forth in claim 1 wherein said gas comprises carbon dioxide.

19. A process as set forth in claim 1 wherein an additive is injected into said gasified fused sugar composition between said evaporator and said cooler.

20. A process as set forth in claim 19 wherein said additive is selected from the group consisting of volatile or thermally sensitive flavors and colors.

* * * * *